United States Patent Office 3,353,908
Patented Nov. 21, 1967

3,353,908
PROCESS FOR THE MANUFACTURE OF
DICALCIUM PHOSPHATE
Joseph Cremer, Hermulheim, near Cologne, and Franz Rodis, Bad Hersfeld, Germany, assignors to Knapsack-Griesheim Aktiengesellschaft, Knapsack, near Cologne, Germany, a corporation of Germany
No Drawing. Filed Oct. 23, 1962, Ser. No. 235,595
Claims priority, application Germany, Oct. 24, 1961,
K 45,016
13 Claims. (Cl. 23—109)

The present invention is concerned with a process for the manufacture of dicalcium phosphate.

It is known to produce dicalcium phosphate ($CaHPO_4$) by adding secondary sodium phosphate ($Na_2HPO_4$) to a neutral calcium-salt solution.

Another method of obtaining $CaHPO_4$ is to precipitate it by means of $Na_2HPO_4$ from a solution of primary calcium phosphate ($Ca(H_2PO_4)_2$).

The present invention provides a process wherein gypsum which is often obtained as a waste product, sometimes in admixture with low priced lime, is used under very specific conditions in conjunction with a primary and/or secondary alkali metal and/or ammonium phosphate as starting material for the production of dicalcium phosphate. The reaction proceeds generally in accordance with the following simplified reaction equations:

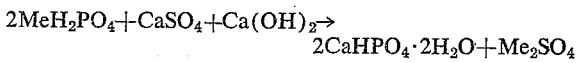
$$2MeH_2PO_4 + CaSO_4 + Ca(OH)_2 \rightarrow 2CaHPO_4 \cdot 2H_2O + Me_2SO_4$$

and

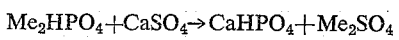
$$Me_2HPO_4 + CaSO_4 \rightarrow CaHPO_4 + Me_2SO_4$$

in which Me is an alkali or ammonium ion and in which $CaCO_3$ can also be used instead of $Ca(OH)_2$.

If these reactions are allowed to take place under normal conditions, they very soon come to a standstill for the reason that a solid crust consisting of the more difficultly soluble $CaHPO_4$ is formed on the surface of the gypsum, the further advance of the reactions being prevented or at least retarded by said crust to such an extent that economically unfeasible length of time is needed to substantially complete the reaction.

It has now been found that the above reactions can be carried out at a sufficiently high reaction velocity by using the solid components in the form of more finely comminuted and mixed particles, whose surface is continuously changed and renewed. The solid components can be so comminuted and mixed in any apparatus which enable the reactants to be intimately mixed and simultaneously extensively comminuted, for example a mortar, ball, tube or oscillating mill.

In contradistinction thereto, it is impossible, even with the use of a high speed agitator, for instance an agitator of the "Turrax-System," to obtain a sufficiently complete reaction even after a prolonged time.

According to a particular embodiment of the present invention the reaction is carried out as follows: gypsum and lime and/or limestone are added in about stoichiometric amounts to a monoalkali phosphate solution containing for example about 20% by weight $P_2O_5$. The resulting suspension should have a pH within the range of about 5.5 to 6.5. The reaction temperature may vary between about 0 and 60° C., and preferably between 20 and 40° C. If the reaction is carried out at a higher temperature, anhydrous dicalcium phosphate is predominantly produced. The time of reaction varied, depending on the reaction apparatus employed, between 15 minutes and 3 hours; it corresponds completely to the principle that the more intensive the renewal of the surface and the mixing, the shorter the time of reaction.

The dicalcium phosphate obtained in easily filterable form can be filtered off in known manner, washed and dried.

As starting materials, there can be used, as already mentioned above, all primary and/or secondary alkali metal and ammonium phosphates if, depending on the desired purity of the final product, the requirement for sufficient purity is fulfilled or the impurities are of such a nature that after the completion of the reaction and after the dicalcium phosphate has been filtered off, they are dissolved in the filtrate and can thus be removed, for instance $Me_2SO_4$, $(NH_4)_2SO_4$, $NaNO_3$ or KCl.

The phosphate liquor obtained in the manufacture of alkali metal and/or alkaline earth metal phosphates can also be used as starting material, particularly in those cases in which it is desired to obtained very pure final products. This process for making phosphates and obtaining simultaneously therewith volatile mineral acids substantially comprising reacting crude phosphates and salts of readily volatile mineral acids with scarcely volatile mineral acids. The individual components are first intensely mixed with one another in about stoichiometrical proportions and in a finely divided form and then allowed to react at normal or an elevated temperature, the resulting compact or pulverulent, non-tacky or slightly tacky reaction mass is heated to a temperature of at most 1200° C. with evaporation of the readily volatile acid portions, the soluble phosphorus salts are extracted with the aid of a solvent and, if desired, evaporated to dryness. This process may be varied within wide limits.

According to a still further feature of the present invention, which is especially used when the purity of the final product is not of such decisive importance, for instance in the case of fertilizer additions, the reaction mixture obtained in the above process, which consists, for instance, of crude phosphate, potassium chloride and sulfuric acid, is first allowed to proceed at an elevated temperature of at most 200° C., with removal of 60 to 90% of the volatile acid and fluorine, depending on the reaction conditions, and may then be directly extracted, i.e. the gypsum is separated. The crude phosphate liquor thereby obtained, after having been reacted with gypsum and/or lime in the manner described above, need not be separated by filtration into the individual compounds dicalcium phosphate and potassium or ammonium phosphate, but can, for instance after drying, be used directly as a fertilizer additive which is practically free of chlorine and fluorine.

Still further, the reaction may be carried out with gypsum alone, i.e. without lime. In this case, it is advantageous to use dialkali phosphates as the starting material, which are easily obtained by neutralizing monoalkali phosphates with sodium hydroxide solution and/or sodium carbonate.

Simplified reaction equation:

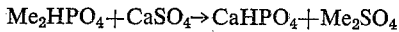
$$Me_2HPO_4 + CaSO_4 \rightarrow CaHPO_4 + Me_2SO_4$$

In addition thereto, the gypsum filtered off in the manner indicated above may be worked up in appropriate manner and then be partially re-used as starting material in the process of this invention for producing dicalcium phosphate.

For this purpose, in the main process, the gypsum is only filtered off partially, i.e., in corresponding stoichiometric quantities, the filtrate is recycled, and the necessary reaction conditions are adjusted in the suspension by the addition of lime, sodium carbonate and/or sodium hydroxide solution. The low price of commercial gypsum, lime and/or limestone should, however, be borne in mind as the case may be.

The process of the invention, depending on the requirements made in a given case, thus enables the production of both an unusually pure dicalcium phosphate, suitable for instance, as fodder and also of less pure products suitable as fertilizer.

The process of the present invention for making dicalcium phosphate is more especially carried out as follows: primary and/or secondary alkali metal and/or ammonium phosphates are allowed to react with gypsum while being intensely mixed and extensively comminuted, the surface of the solid reaction components being thereby continuously renewed, and the reaction product is worked up in known manner.

The alkali metal and/or ammonium phosphates are preferably used in the form of their hydrates or in the form of a solution. The mixture of phosphate and gypsum used as the starting material may also contain lime and/or limestone or sodium carbonate and/or sodium hydroxide solution as further components.

The reaction is preferably carried out at a temperature within the range of about 0 to 60° C., advantageously 20 to 40° C., at a pH-value within the range of about 4 to 8, advantageously 5.5 to 6.5.

In one embodiment of the process of the present invention the starting material is a phosphate solution or a crude alkali metal phosphate liquor which is obtained as folows: an alkali metal and/or alkaline earth metal salt with a readily volatile mineral acid and a crude phosphate are reacted with a scarcely volatile mineral acid; the reaction is carried out by intensely mixing the components with one another in about stoichiometrical proportions and in finely divided form at normal or at a raised temperature, the resulting compact or pulverulent, non-tacky or slightly tacky reaction mass is heated to a temperature of at most 1200° C. with evaporation of the readily volatile acid portions, and the soluble phosphorus salts are extracted with a solvent. For example, a monoalkali metal phosphate crude liquor may be prepared by mixing phosphate ore, alkali metal chloride and sulfuric acid, allowing the mixture to ripen at a temperature within the range of about 20 to 200° C., and extracting the resulting reaction product, for example, with $H_2O$. The crude liquor thereby obtained can be reacted in the manner described above with the gypsum simultaneously obtained in this reaction.

The following examples serve to illustrate the invention, but they are not intended to limit it thereto:

Example 1

100 parts by weight of monosodium phosphate solution having a $P_2O_5$-content of 15.6% were mixed with 19 parts by weight of calcium sulfate dihydrate and 8 parts by weight of calcium hydroxide and treated for 6 hours at temperatures of 20 to 40° C. while agitating with a turbine agitator (5000 r.p.m.) of the Turrax System. The calcium phosphate formed was filtered off, but could not be washed free of sulfate even with 6000 to 8000 parts by weight of water.

| Analysis: | Percent |
|---|---|
| CaO | 37.0 (32.5 [1]) |
| $P_2O_5$ | 40.0 (41.3 [1]) |
| Ignition loss | 19.0 (26.2 [1]) |

[1] Values calculated for $CaHPO_4 \cdot 2H_2O$.

Example 2

100 parts by weight of monosodium phosphate solution having a $P_2O_5$ content of 15.6% by weight were mixed with 19 parts by weight of calcium sulfate dihydrate and 8 parts by weight of calcium hydroxide and treated for 2 hours in a ball mill at temperatures of 20 to 40° C. The resultant calcium phosphate dihydrate was filtered off and washed free of sulfate with about 1000 to 2000 parts by weight of water, and thereupon dried at 60° C. The yield was 98% dicalcium phosphate, referred to the monosodium phosphate employed.

| Analysis: | Percent |
|---|---|
| CaO | 32.3 |
| $P_2O_5$ | 40.5 |
| Ignition loss | 26.0 |

Example 3

100 parts by weight of monosodium phosphate solution containing 15.6% by weight $P_2O_5$ were adjusted to a pH of 7.0 by the addition of sodium hydroxide solution (about 50% solution). Thereupon, 37 parts by weight of calcium sulfate dihydrate were added and the suspension placed for 30 minutes in an oscillating mill. The reaction temperature was less than 60° C. The resultant dicalcium phosphate was suction-filtered, washed free of sulfate with 1000 to 2000 parts by weight of water and dried at 60° C. The yield was 95% $CaHPO_4 \cdot 2H_2O$ referred to the $P_2O_5$ employed.

| Analysis: | Percent |
|---|---|
| CaO | 32.5 |
| $P_2O_5$ | 41.0 |
| Ignition loss | 25.8 |

Example 4

100 parts by weight of monopotassium phosphate solution of 16.3% by weight $P_2O_5$ which contained 20 parts by weight of gypsum, were admixed with 9 parts by weight of calcium hydroxide, and the whole was then treated for one hour in a ball mill. The resultant suspension was concentrated by known methods and dried at 200° C. (and

| Analysis: | Percent |
|---|---|
| CaO | 25.6 |
| $P_2O_5$ | 32.9 |
| $K_2O$ | 21.2 |
| $SO_3$ | 18.7 |

We claim:
1. In the process for the manufacture of dicalcium phosphate by reacting gypsum with a phosphate reactant selected from the group consisting of primary alkali metal phosphate, secondary alkali metal phosphate, primary ammonium phosphate and secondary ammonium phosphate, the improvement which comprises admixing reactants in about stoichiometric amounts and reacting the mixture by continuously removing the surfaces of solid reactants while being comminuted and mixed with the remaining starting components.

2. The process of claim 1, wherein the gypsum reactant is used in about stoichiometrical amounts.

3. The process of claim 1, wherein the alkali metal phosphate and the ammonium phosphate reactants are utilized as hydrates.

4. The process of claim 1, wherein the alkali metal phosphate and the ammonium phosphate reactants are utilized as solution.

5. The process of claim 1, wherein the reactant is effected at a temperature of about 0–60° C.

6. The process of claim 5, wherein the reaction is effected at a temperature of about 20–40° C.

7. The process of claim 1, wherein the reaction is effected at a pH-value of about 4–8.

8. The process of claim 7, wherein the reaction is effected at a pH-value of about 5.5–6.5.

9. The process of claim 4, wherein the dicalcium phosphate product is recovered by filtration from dissolved impurities, washed and dried.

10. The process of claim 1, wherein the starting material used is a crude liquor of monoalkali metal phosphate which is obtained by mixing phosphate ore, alkali metal chloride and sulfuric acid, allowing the resulting mixture to react and ripen at a temperature within the range of about 20 to 200° C., and extracting the resulting reaction product with water.

11. The process of claim 1 wherein the phosphate and the gypsum used as the starting components are further admixed with at least one member selected from the group consisting of dissolved sodium carbonate and sodium hydroxide.

12. The process of claim 1 wherein the phosphate and the gypsum reactants are admixed with at least one added substance selected from the group consisting of lime and limestone.

13. The process of claim 1 wherein the phosphate reactant is a phosphate solution obtained as the product of the reaction of
(a) a first component selected from the group consisting of alkali metal and alkaline earth metal salts of a readily volatile mineral acid, and a crude phosphate with
(b) a second component consisting of a substantially non-volatile mineral acid, said phosphate solution being obtained by intensely admixing (a) and (b) in about stoichiometric amounts at a temperature range of ambient temperature up to about 1200° C., removing volatile acid by-products, the soluble phosphorus salt product being thereafter recovered as a solution after removal of volatile acid by-products.

References Cited
UNITED STATES PATENTS

| | | | |
|---|---|---|---|
| 123,744 | 2/1872 | Tanner | 23—108 |
| 1,435,928 | 11/1922 | Kipper | 23—1 |
| 1,699,393 | 1/1929 | Hagens et al. | 23—109 |
| 1,826,785 | 10/1931 | Holz | 23—109 X |
| 2,021,671 | 11/1935 | Skinner | 23—1 X |
| 2,053,266 | 9/1936 | Curtis | 23—109 |

MILTON WEISSMAN, *Primary Examiner.*

OSCAR R. VERTIZ, *Examiner.*

O. F. CRUTCHFIELD, *Assistant Examiner.*